June 9, 1953 — W. KINGSBURY — 2,641,354
BANKED CONVEYER
Filed June 1, 1949 — 6 Sheets-Sheet 1
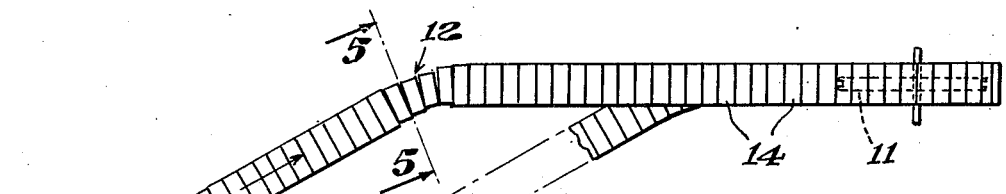
FIG. 1
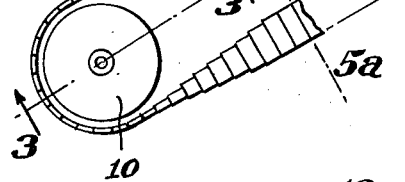
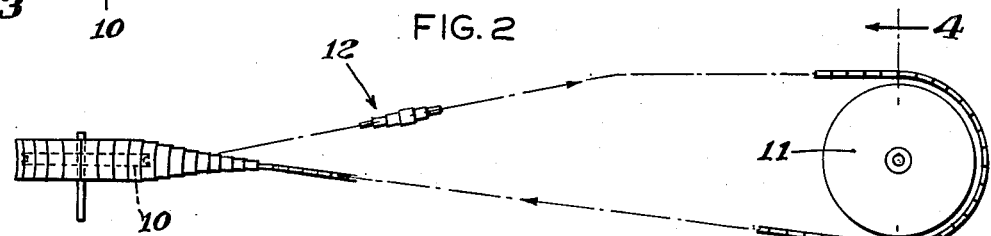
FIG. 2
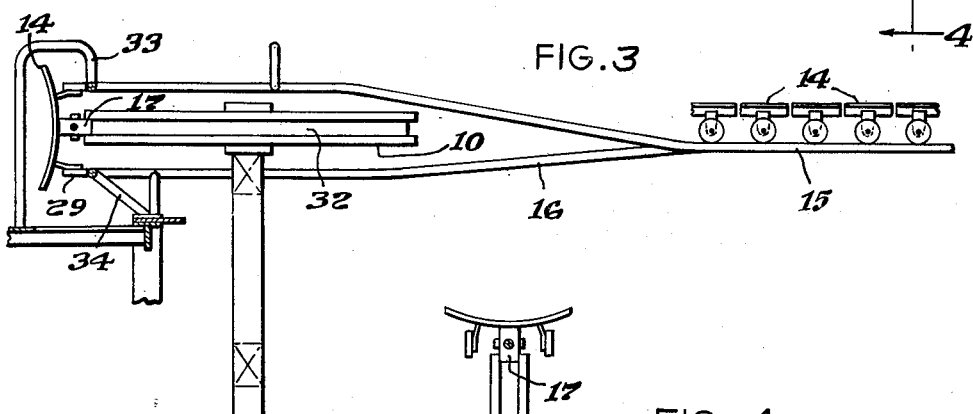
FIG. 3
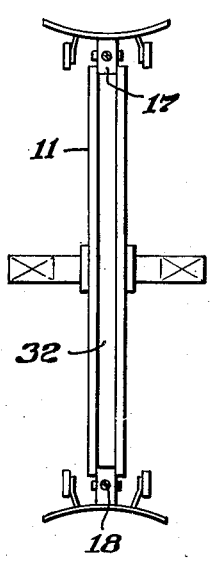
FIG. 4
INVENTOR.
Webb Kingsbury
Rowland F. Patrick
BY
ATTORNEY FIG.5
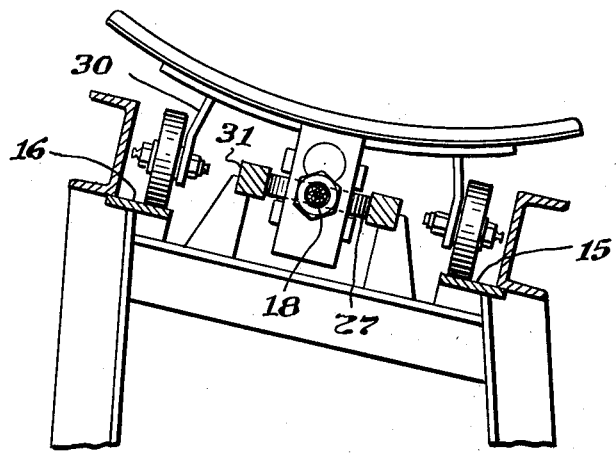
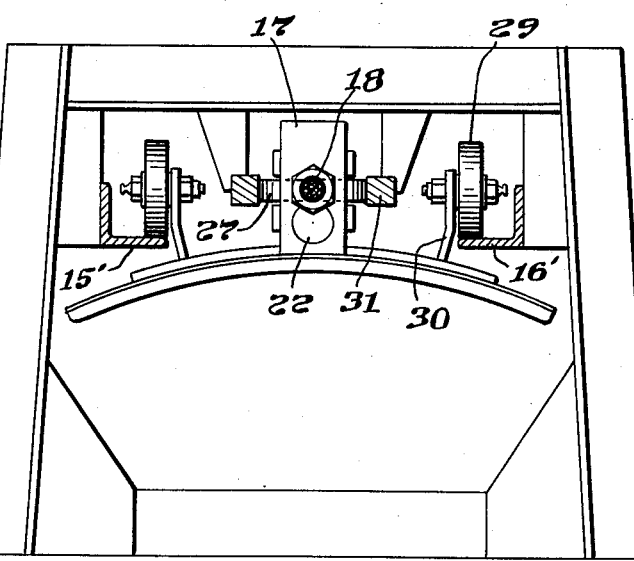
FIG.5a June 9, 1953     W. KINGSBURY     2,641,354
BANKED CONVEYER Filed June 1, 1949     6 Sheets-Sheet 4

INVENTOR
Webb Kingsbury
PER Rowland J. Patrick
ATTORNEYS

June 9, 1953 W. KINGSBURY 2,641,354
BANKED CONVEYER

Filed June 1, 1949 6 Sheets-Sheet 6

INVENTOR.
Webb Kingsbury
Rowland V. Patrick
BY
ATTORNEY

Patented June 9, 1953

2,641,354

UNITED STATES PATENT OFFICE 2,641,354

BANKED CONVEYER

Webb Kingsbury, Dumont, N. J., assignor to United Fruit Company, Boston, Mass., a corporation of New Jersey Application June 1, 1949, Serial No. 96,567

7 Claims. (Cl. 198—182)

My invention relates to material and article handling equipment and more particularly concerns an endless conveyor system adapted for operation in curved as well as straight paths. The system is of the type including a plurality of closely spaced interconnected platforms or trays receiving the load to be transported.

The present application is a continuation-in-part of my application, Serial No. 732,631, filed March 5, 1947, and now abandoned.

The system herein is distinguished in that provision is made for banking the load-carrying members as they proceed around curved sections. This enables operation at substantially higher speeds than is possible with systems heretofore proposed and enables arrangement of the load-carrying members in so nearly abutting relationship that taken together they represent a substantially uninterrupted surface. A related feature of the invention resides in the employment at one or both ends of the conveyor system of a "turn-around" section which is disposed in the plane of travel of the load-carrying members and which is negotiated by them after they have been gradually turned through an angle of 90°. Where both of the turn-around sections are so disposed the system is adapted for carrying loads in opposite directions simultaneously.

I shall describe my invention with the aid of the accompanying drawings in which, Fig. 1 is a diagrammatic plan view of a system in which the load-carrying members are interconnected by flexible elements permitting of articulation in any plane;

Fig. 2 is a diagrammatic elevation of the system of Fig. 1;

Figs. 3 and 4 are sections on the lines indicated in Figs. 1 and 2 respectively;

Fig. 5 is a section on the line 5—5 in Fig. 1;

Fig. 5a is a section on the line 5a—5a in Fig. 1;

Figure 6:
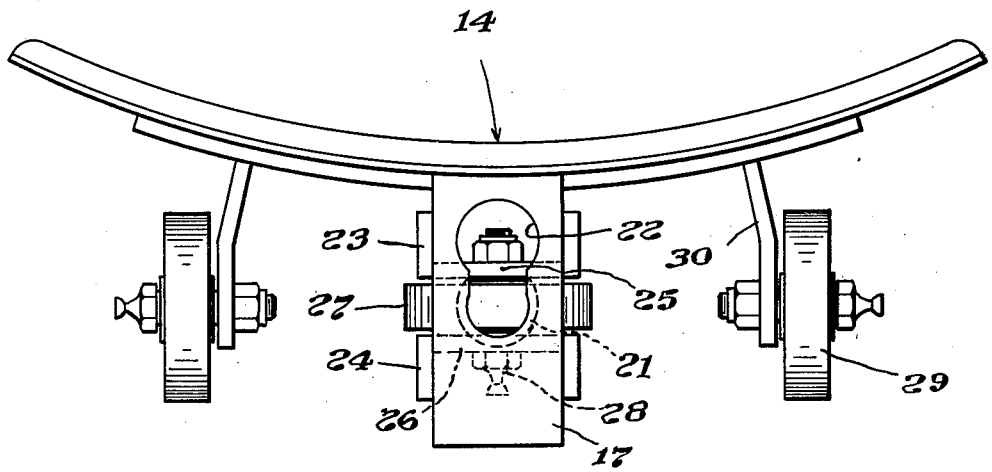
Fig. 6 is an end view of one of the load-carrying members.
Figure 7:
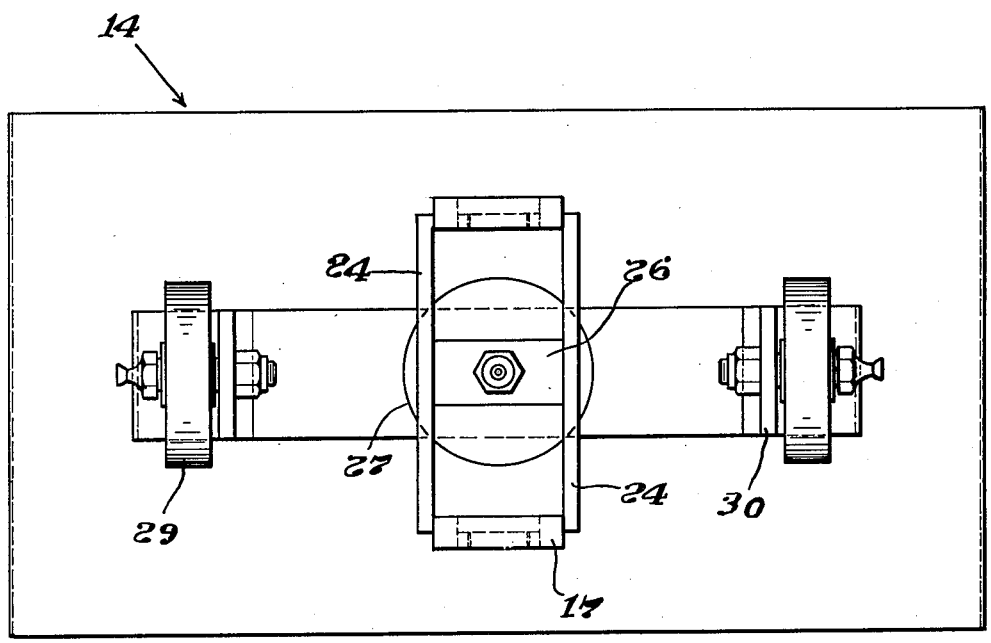
Fig. 7 is a worm's-eye-view of one of said members.
Figure 8:
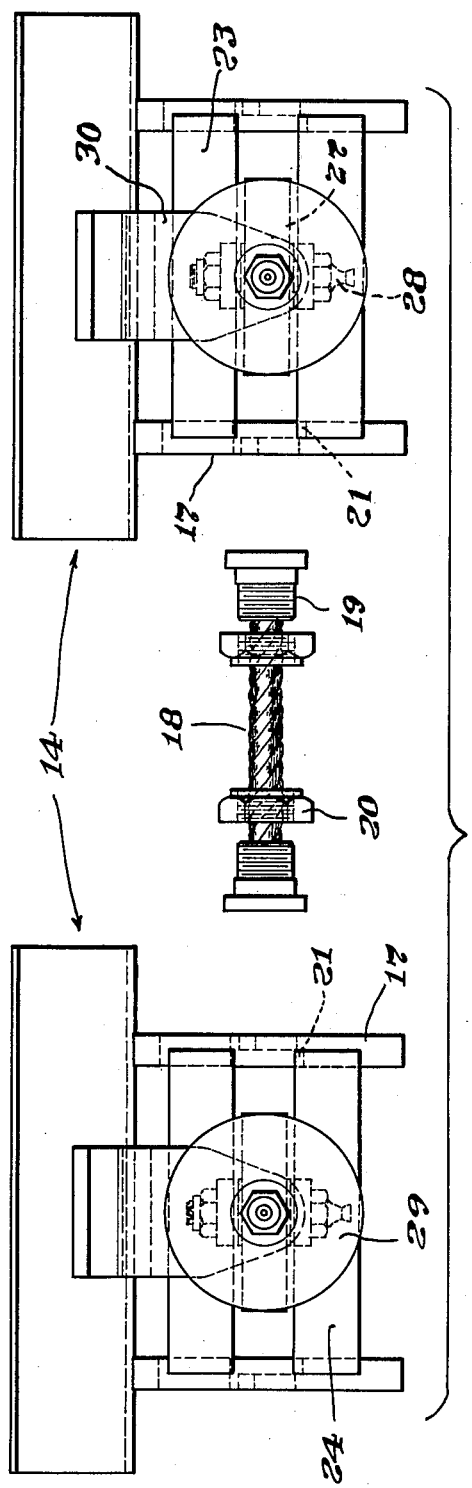
Fig. 8 is an exploded view illustrating the manner in which the said members are interconnected.

Referring first particularly to Figs. 1 and 2, the system is shown as including a rotary turn-around member 10, rotating about a vertical axis, and a similar turn-around member 11 disposed with its axis horizontal. The upper run of the system comprises a curved section 12. Wheeled trucks or trays 14 (shown in detail, Figs. 6–8) ride on a trackway comprising upper rails or tracks 15 and 16 and lower rails 15' and 16' (see Figs. 3, 5 and 5a). The trucks may be driven in any suitable manner but are preferably impelled through the lugs 17 depending therefrom. In one highly successful installation I employ as the impelling means a sprocket-driven endless belt of chain construction having cross members spaced to provide pockets receiving the lower portion of the lugs. Assuming an arrangement such as indicated by Figs. 1 and 2, the belt may be positioned, with advantage, to operate on the trucks as they negotiate the longer straight section of the lower run. The trucks at this point are disposed with their lugs and wheels up, the body or platform portions of the trucks hanging below the rails 15' and 16'.

In the form of the invention represented by Figs. 1–8 the trucks are interconnected by short sections of wire cable 18 (see Fig. 8), the cable sections being joined to the trucks by means of threaded elements 19, fixed to the cable sections at the ends thereof, and nuts 20. The heads of the threaded elements seat in recesses 21 in the lugs 17, being passed through the upper larger portion of the bayonet slots 22 (see Fig. 6), while the nuts 20 on making the connection are threaded flush against the face of the lugs.

The lugs of each truck are connected by tie bars 23 and 24, welded or otherwise fixedly secured to the lugs, the tie bars themselves being joined by cross pieces 25 and 26 which serve to support a shaft on which a guide roller 27 is mounted. This shaft is provided with a special fitting 28 of conventional design for lubrication purposes. Similar fittings will be noted as associated with the stub shafts on which the wheels or casters 29 are mounted and which are held by legs 30 fixed to the body of the truck.

Guides 31 (see Figs. 5 and 5a) prevent lateral displacement of the trucks. Unlike the trackway, these guides do not course the turn-around sections, their function in the case of such sections being taken over by the rotary members 10, 11, each of which will be noted as provided with a peripheral groove 32 receiving the lugs 17 of the trucks. This arrangement relieves strain on the cable sections during the reversal.

Reverting now to Figs. 1 and 2, the trucks passing along the lower course are disposed, as previously stated, with their wheels up, the rails 15' and 16' and guides 31 being above the bodies of the trucks (see Fig. 5a). As the trucks approach rotary member 10 they are gradually turned inwardly, i. e. clockwise, the turning being accompanied by twisting of the cable sections linking the trucks, and being brought about by banking of the trackway. The transfer from rails 15' and 16' to rails 15 and 16, respectively, is effected at about the point the trucks have been turned 45°.

During the stage of their carriage by the rotary member 10, the trucks are disposed at an angle of substantially 90°. On leaving such member, the trucks are gradually restored to their load-carrying position, the inner rail 15 being gradually depressed and the outer rail 16 being gradually raised to this end—see Fig. 3 wherein the numerals 33 and 34 denote supports for rail 15 and rail 16, respectively.

To avoid loss of load on the horizontal curved section 12, the trucks as they enter such section are gradually tilted inwardly, the degree of tilt being a function of the sharpness of the curve and the speed of the trucks. The tilting is produced by depressing rail 15 and raising rail 16. On the far side of the curve, rail 15 is gradually raised and rail 16 gradually depressed to restore the trucks to their unbanked condition. Guides 31 are depressed or raised correspondingly with the rails.

In the case of the vertical turn-around section at the left in Figs. 1 and 2, the transfer from rails 15 and 16 to rails 15' and 16', respectively, occurs at about the mid-point of the turn-around.

It should be emphasized that in the construction of Figs. 1–8, there is no relative movement between the cable sections and the trucks, the cable sections twisting upon themselves to accommodate the difference in angularity between adjacent trucks during the banking and unbanking. The cable sections are always in their normal untwisted condition when there is no difference in angularity.

Figure 9:
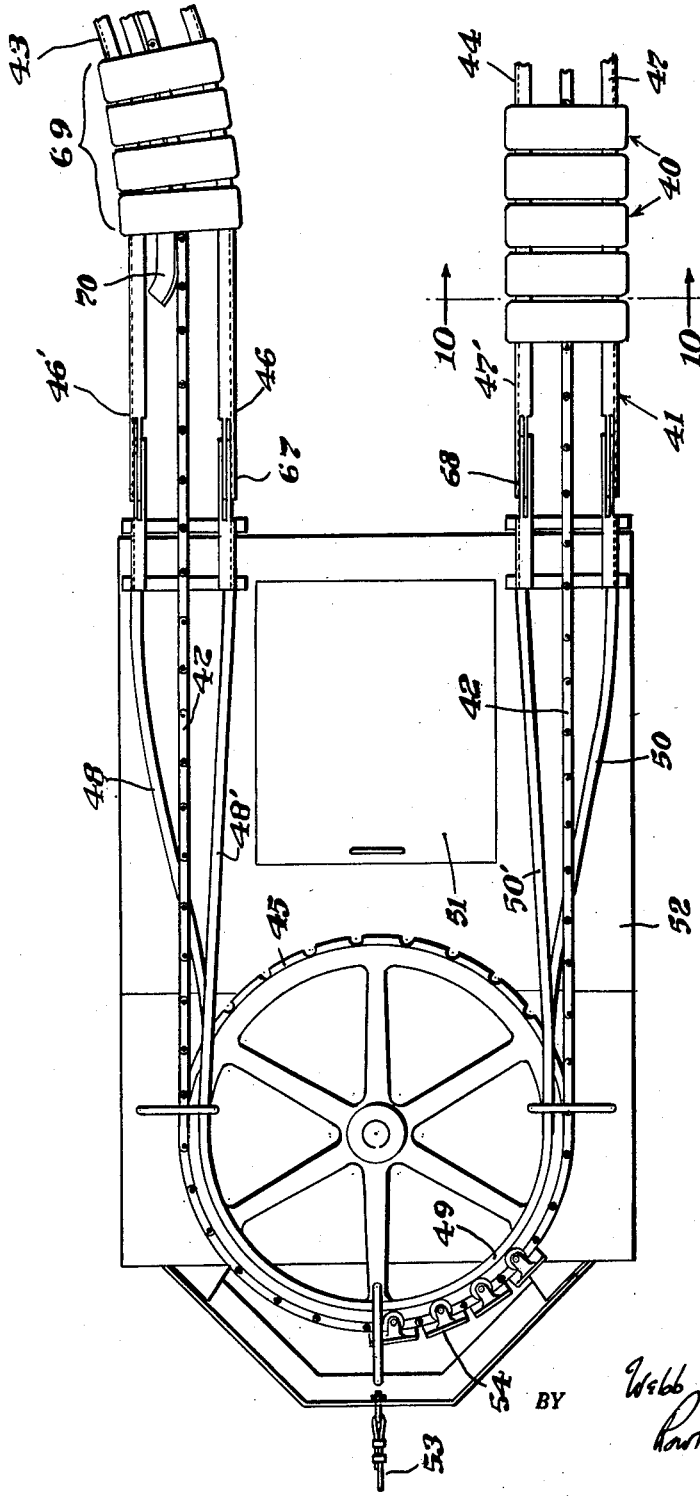
Fig. 9 is a plan view of a system conforming to the invention in which a chain drive, articulate in only one plane, is utilized as the means by which the load-carrying members are interconnected.
Figure 10:
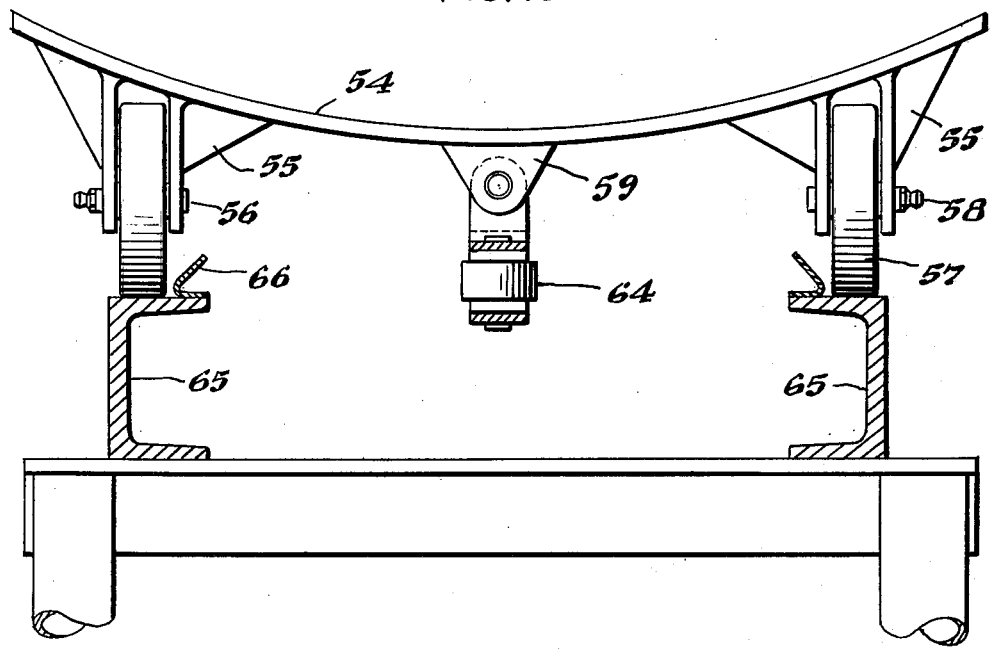
Fig. 10 is a section on the lines indicated in Fig. 9.
Figure 11:
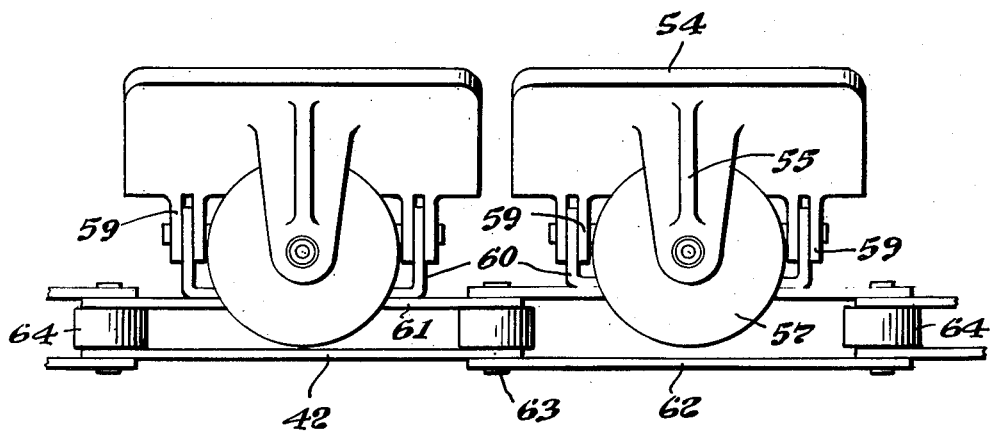
Fig. 11 is a view at right angles to the view of Fig. 10.

Referring now to Figs. 9, 10 and 11, this system will also be seen as comprising an articulated train of individual trucks, indicated generally at 40, which provide the load-supporting and carrying surface. The trucks are supported for rolling movement on a two-rail trackway 41 and are guided and moved along the trackway by an endless drive chain 42 disposed between the rails of the trackway. In the layout as shown, the system includes two flights, an advancing flight 43 and a return flight 44, the flights passing around horizontally disposed sprocket wheels, one of which is shown at 45 in Fig. 9, at the ends of the system.

The trackway is formed by spaced rails 46 and 46' along the advancing flight 43 and similar rails 47 and 47' along the return flight 44. At the turn-around, special rail sections are provided comprising approach rails 48, 48', turn-around rails 49 and return rails 50, 50'. The weight of the trucks and the load carried by them is supported entirely by the trackway 41, except at the turn-arounds where the weight of the trucks is transferred to the sprockets. The sprockets may be driven in any suitable manner to advance the chain 42 and the trucks around the trackway. The numeral 51 indicates a hatchway at the top of a housing protecting the motor and drive mechanism from dust and dirt, the motor and drive being mounted on a movable carriage 52 which is urged longitudinally to the left in Fig. 9 as by a counterweight, not shown, secured to the cord 53 which passes around a fixed-axle pulley, not shown, the counterweight being suspended below the pulley. Since the lower end of the shaft of the sprocket wheel 45 is journaled in a bearing member fixed to the carriage 52, the counterweight maintains the drive chain continuously under the desired tension.

Each truck (see Figs. 10 and 11) includes a platform 54 having a load-carrying upper surface which is curved in the manner of the platforms of the trucks utilized in the system of Figs. 1–8. In plan, the platforms are approximately rectangular in shape, with rounded corners, and the platforms of adjacent trucks are spaced from each other only a very short distance. Also, as in the case of the previously described system, the spacing between them is such as to form a substantially uninterrupted trough-like, load-receiving surface for the articles or materials to be conveyed. In effect, the load-supporting surface is the substantial equivalent of an endless belt. Thus a stem of bananas, for example, may be placed on the conveyor at any point without regard to how it is positioned with respect to any particular truck or trucks.

The platforms 54 of the trucks are equipped at each end with a pair of depending brackets 55 for supporting the truck axles. These brackets may be secured to the platform by welding, bolting, or in any other suitable way, but are preferably cast integral with the platform. Each of the pairs of brackets 55 carries an axle 56 on which is mounted a roller or wheel 57. The axles 56 may be equipped with pressure lubrication fittings 58 communicating with bores leading to the bearings within the wheels.

Two pairs of depending spaced ears 59 are cast integral with the platform, or are suitably secured to the platform, to receive the legs of a substantially U-shaped bracket 60 which is secured along its back, as by welding, to a link of the chain 42. Under this arrangement, the platforms are tiltable transversely of the path of their movement.

The chain 42 is made up of a series of upper and lower equally-pitched links indicated at 61 and 62, respectively. These links overlap at their ends and are interconnected for pivotal movement by pins 63 on which rollers 64 are mounted. It will be noted that there is one pair of links for each truck.

Unlike the flexible cable sections, chain 42 is articulate in one plane only, a horizontal plane in the instance of the particular system. However, since the system does not include a vertically disposed turn-around section, articulation in the single plane is adequate. Due to the rigid connection between the element 60 and the upper links 61, the drive chain, in addition to performing its primary driving and guiding function, serves to prevent longitudinal tilting of the individual trucks about the axles 56. The relatively wide spacing of the pairs of ears 59 further contributes to the longitudinal rigidity of the train of platforms.

The trackway along the advancing and return flights 43 and 44, respectively, may be of any appropriate design but is shown (see Fig. 10) as constituted of channel bars 65 equipped with flange pieces 66 which may or may not be necessary depending upon operating conditions.

Rails 48, 48', 49, 50 and 50' are tubular in cross section and may be formed from rod or tube stock or even common iron pipe. The section of the trackway comprising rails 48 and 48' is so designed that the individual trucks as they approach the sprocket wheel 45 are banked outwardly at a progessively increasing angle until they reach the turn-around section where they are disposed in a vertical position with the platforms 54 facing outwardly. To this end, the outer approach rail 48 is gradually depressed and curved inwardly and the inner approach rail 48' gradually elevated and curved outwardly. Rails 48 and 48' merge into rails 49 of the turn-around section, these rails being circularly curved about the axis of the sprocket wheel 45, while rails 49 merge into the rails 50, 50'. The latter are curved in the same manner as the rails 48, 48' of the approach section but in the opposite direction so that the trackway of the return section gradually levels out as it leaves the turn-around section and re-assumes its normal horizontal position before it joins the rails 47, 47' of the return flight 44. It will, of course, be understood that the articles or materials being carried are normally removed before they reach the turn-around section.

To permit movement of the carriage 52 to adjust the tension in the drive chain 42, sliding couplings 67 and 68 are provided in the advance flight trackway and the return flight trackway, respectively. These couplings include slip joints giving a substantially continuous upper surface for the accommodation of the wheels of the trucks, yet permit the leftward movement necessary for the tensioning.

The disclosed system will be noted as including a curved flight 69. Such flight comprises a stationary, appropriately curved guide 70 positioned to engage the rollers 64 of the drive chain to deflect the drive chain from the straight path that it would otherwise tend to follow. As in the case of the curved section 12 of the system herein first described, the trackway at the point of the curved flight 69 is appropriately banked, the inner rail being elevated, the outer rail being depressed. A most important advantage of the banking, apart from the fact that it prevents loss of load on the curve, resides in the fact that the platforms 54 of adjacent trucks are maintained in substantially abutting relationship. As will be readily seen, if the platforms were maintained in a horizontal plane during their negotiation of the curved flight, the ends of adjacent platforms on the inner side of the curve would be brought into contact with damage likely from the resulting jamming. Heretofore this difficulty has been overcome by the expedient of copping off the corners of the platforms, which is manifestly undesirable as reducing the effective load-carrying area and as interrupting the continuity of the surface at the points of the corners.

The banking of the trucks outwardly as they pass around the sprocket wheel permits the turn-around to be made on a radius relatively quite small compared to that which would be necessary should the turn-around be negotiated with the platforms disposed radially of the sprocket wheels.

It is to be understood that the foregoing disclosure is made by way of illustration only and not by way of limitation of the invention. Those skilled in the art will immediately appreciate that many changes and modifications may be made without departure from the invention as defined in the appended claims.

I claim:

1. In a conveyor system having a straight horizontal section and a contiguous horizontal turn-around section, a train of closely spaced interconnected wheeled trucks adapted to be driven along said straight section and around said turn-around section, said trucks being tiltable transversely of the path of their movement, a two-railed trackway following the course of the system and serving to support said trucks through the wheels associated therewith, said trackway gradually banking outwardly as it approaches said turn-around section and gradually returning to an unbanked state as it leaves said turn-around section, the angle of the banking around the turn-around section being substantially 90°.

2. In a conveyor system having a straight section, a contiguous turn-around section and a second curved section of a lesser degree of curvature than the turn-around section, each of said sections being on a substantially horizontal plane, a train of closely spaced interconnected wheeled trucks adapted to be driven along said straight section and around the curved sections, said trucks being tiltable transversely of their path of movement, and a two-railed trackway following the course of the system and serving to support said trucks through the wheels associated therewith, said trackway being banked around said second curved section in a direction corresponding with the direction of curvature thereof and outwardly at an angle of 90° around said turn-around section.

3. In a conveyor system having a straight section and a contiguous turn-around section in the plane of the straight section, a train of closely spaced wheeled trucks interconnected by flexible elements yieldable to torque, said elements being fixedly secured to said trucks, means for driving said trucks along said straight section and around said turn-around section and a trackway following the course of the system and serving to support said trucks through the wheels thereon, said trackway gradually banking as it approaches the turn-around section and gradually returning to an unbanked state as it leaves said turn-around section, the angle of the banking around the turn-around section being substantially 90°.

4. In a conveyor system having a straight section, a contiguous turn-around section and a second curved section of a lesser degree of curvature than the turn-around section, each of said sections being on a substantially horizontal plane, a train of closely spaced wheeled trucks interconnected by flexible elements yieldable to torque, said elements being fixedly secured to said trucks, means for driving said trucks along said straight section and around the curved sections and a two-railed trackway following the course of the system and serving to support said trucks through the wheels thereon, said trackway being banked inwardly around said second curved section and at an angle of 90° around said turn-around section.

5. In a conveyor system having a straight section and a rotary turn-around member disposed with its axis perpendicular to the plane of the straight section, a train of closely spaced wheeled trucks interconnected by flexible elements yieldable to torque, said elements being fixedly secured to said trucks, means for driving said trucks along said straight section and around said rotary member and a trackway following the course of the system and serving to support said trucks through the wheels thereon, said trackway gradually banking as it approaches said rotary member and gradually returning to an unbanked state as it leaves said member, the angle of the banking around the rotary member being substantially 90°.

6. In a conveyor system having a horizontal straight section and a horizontally disposed rotary turn-around member, a train of closely spaced wheeled trucks interconnected by short sections of flexible cable fixedly secured to said trucks, means for driving said trucks along said straight section and around said rotary member and a two-railed trackway following the course of the system and serving to support said trucks through the wheels thereon, said trackway gradually banking as it approaches said rotary member and gradually returning to an unbanked state as it leaves said member, the angle of the banking around the rotary member being substantially 90°.

7. In a conveyor system having a straight horizontal section and a contiguous horizontal turn-around section, a train of closely spaced interconnected wheeled trucks adapted to be driven along said straight section and around said turn-around section, said trucks being tiltable transversely of the path of their movement, a two-railed trackway following the course of the system and serving to support said trucks through the wheels associated therewith, said trackway gradually banking as it approaches said turn-around section and gradually returning to an unbanked state as it leaves said turn-around section, the angle of the banking around the turn-around section being substantially 90°, the direction of the banking being determined by the disposition of the trucks as they approach the turn-around section, being inwardly in the event the trucks are at this point suspended from the rails through their wheels, being outwardly in the event the trucks are disposed upright on the rails.

WEBB KINGSBURY.

References Cited in the file of this patent

UNITED STATES PATENTS

| Number | Name | Date |
|---|---|---|
| 811,991 | Acklin | Feb. 6, 1906 |
| 1,365,984 | Guild | Jan. 18, 1921 |
| 1,911,525 | Neuman | May 30, 1933 |
| 2,306,431 | Exley | Dec. 29, 1942 |
| 2,548,061 | Read | Apr. 10, 1951 |